(12) United States Patent
Lin et al.

(10) Patent No.: US 12,674,761 B2
(45) Date of Patent: Jul. 7, 2026

(54) DEFECT DETECTION AND REMOVAL APPARATUS AND METHOD

(71) Applicant: PlayNitride Display Co., Ltd., MiaoLi County (TW)

(72) Inventors: Chang-Rong Lin, MiaoLi County (TW); Ching-Liang Lin, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 724 days.

(21) Appl. No.: 17/990,759

(22) Filed: Nov. 21, 2022

(65) Prior Publication Data

US 2024/0118222 A1 Apr. 11, 2024

(30) Foreign Application Priority Data

Oct. 11, 2022 (TW) .................................. 111138334

(51) Int. Cl.
*G06T 7/00* (2017.01)
*G01N 21/88* (2006.01)

(52) U.S. Cl.
CPC ......... *G01N 21/8851* (2013.01); *G06T 7/001* (2013.01); *G01N 2021/8887* (2013.01); *G06T 2207/30148* (2013.01)

(58) Field of Classification Search
CPC ........ G01N 21/8851; G01N 2021/8887; G06T 7/001; G06T 2207/30148; H01L 22/12
See application file for complete search history.

(56) References Cited

U.S. PATENT DOCUMENTS

| | | | |
|---|---|---|---|
| 8,978,670 | B2 | 3/2015 | Minamida et al. |
| 2008/0036899 | A1 | 2/2008 | Yamashita |

(Continued)

FOREIGN PATENT DOCUMENTS

| | | |
|---|---|---|
| CN | 103809309 | 5/2014 |
| CN | 108682365 | 10/2018 |

(Continued)

OTHER PUBLICATIONS

Abd Al Rahman M. et al. "A Review and Analysis of Automatic Optical Inspection and Quality Monitoring Methods in Electronics Industry", in electronics industry. IEEE Access. Oct. 6, 2020;8:183192-271.*

(Continued)

*Primary Examiner* — Samir A Ahmed
(74) *Attorney, Agent, or Firm* — JCIPRNET

(57) ABSTRACT

A defect detection and removal apparatus including a removing unit, an image capturing unit, and a determining unit is provided. The removing unit is configured to remove at least one defective micro-element on a substrate. The image capturing unit is configured to capture a detection image of at least one defective micro-element correspondingly on the substrate. The determining unit is coupled to the image capturing unit and the removing unit. The image capturing unit executes capturing a first detection image before the removing unit executes removing a defective micro-element, and executes capturing a second detection image after the removing unit executes removing the defective micro-element. The determining unit confirms whether the defective micro-element has been removed according to the first and second detection image obtained from the image capturing unit. A defect detection and removal method is also provided.

10 Claims, 5 Drawing Sheets

(56) References Cited

U.S. PATENT DOCUMENTS

| | | | | |
|---|---|---|---|---|
| 2017/0141155 A1 * | 5/2017 | Hughes | ................ | H01L 25/167 |
| 2021/0050271 A1 * | 2/2021 | Lin | ........................ | H01L 22/22 |
| 2022/0005173 A1 * | 1/2022 | Hwang | .................... | G06N 3/08 |

FOREIGN PATENT DOCUMENTS

| | | | | | |
|---|---|---|---|---|---|
| CN | 109887461 | | 6/2019 | | |
| CN | 110491795 | | 11/2019 | | |
| CN | 110491795 | A | 11/2019 | | |
| CN | 111221732 | A | 6/2020 | | |
| CN | 111785813 | | 10/2020 | | |
| CN | 113065673 | A | * | 7/2021 | ............ G06V 20/00 |
| JP | 2010019885 | | 1/2010 | | |
| TW | 202011493 | | 3/2020 | | |
| TW | 202205025 | | 2/2022 | | |
| WO | 2017119028 | | 7/2017 | | |

OTHER PUBLICATIONS

"Office Action of China counterpart Application", issued on Nov. 29, 2025, p. 1-p. 8.
"Office Action of China Counterpart Application", issued on Apr. 25, 2025, p. 1-p. 9.
"Office Action of Taiwan Counterpart Application", issued on Mar. 9, 2023, pp. 1-3.

* cited by examiner

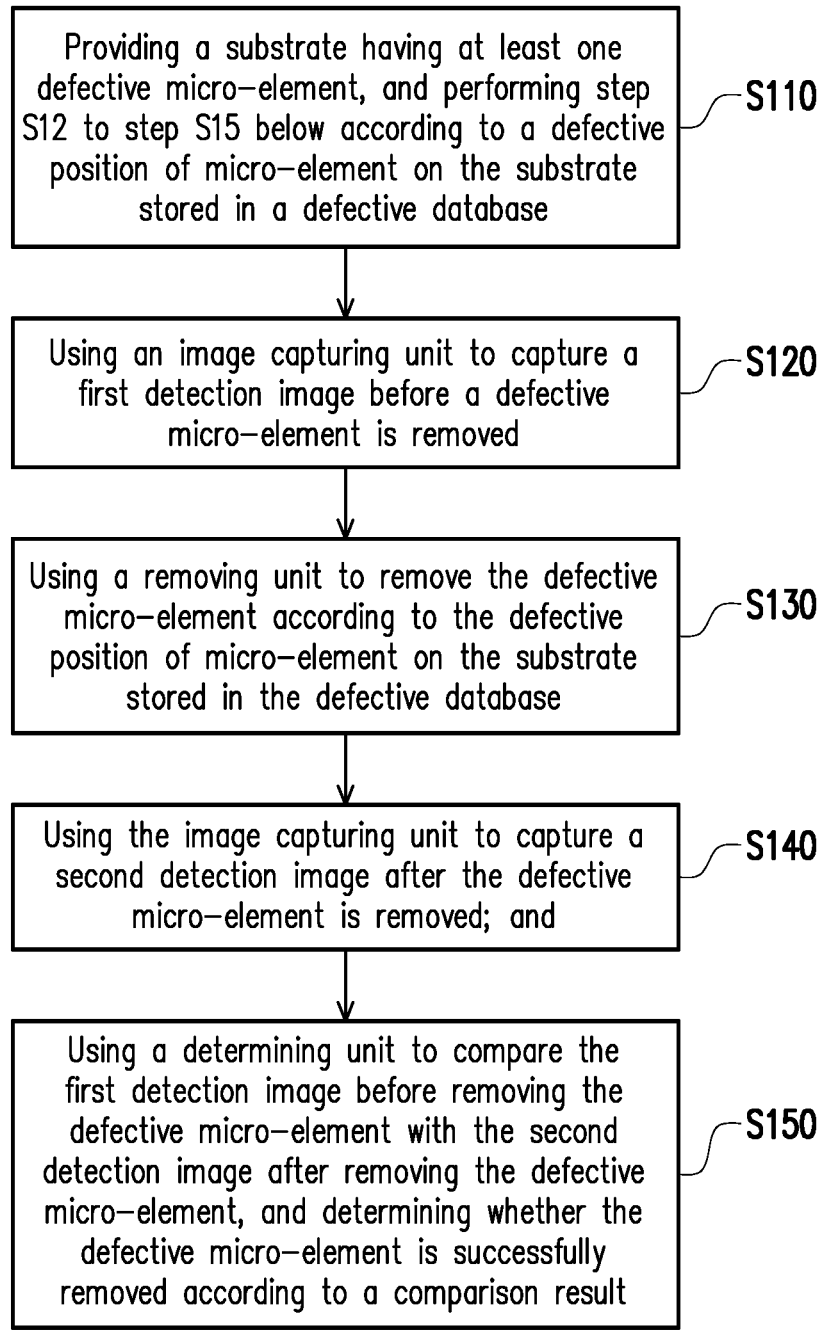

Providing a substrate having at least one defective micro-element, and performing step S12 to step S15 below according to a defective position of micro-element on the substrate stored in a defective database ⟶ S110

Using an image capturing unit to capture a first detection image before a defective micro-element is removed ⟶ S120

Using a removing unit to remove the defective micro-element according to the defective position of micro-element on the substrate stored in the defective database ⟶ S130

Using the image capturing unit to capture a second detection image after the defective micro-element is removed; and ⟶ S140

Using a determining unit to compare the first detection image before removing the defective micro-element with the second detection image after removing the defective micro-element, and determining whether the defective micro-element is successfully removed according to a comparison result ⟶ S150

FIG. 4

DEFECT DETECTION AND REMOVAL APPARATUS AND METHOD

CROSS REFERENCE TO THE RELATED APPLICATIONS

This application claims the priority benefit of Taiwan application serial no. 111138334, filed on Oct. 11, 2022. The entirety of the above-mentioned patent application is hereby incorporated by reference herein and made a part of this specification.

BACKGROUND

1. Technical Field

The present application is related to a detection apparatus and a method, and more particularly to a defect detection and removal apparatus and method.

2. Description of Related Art

With the advancement in manufacturing process of semiconductor devices, electronic elements are made smaller, and miniature electronic elements, such as micro light-emitting diodes, are fabricated. Taking the manufacturing process of micro-LED as an example, micro-LEDs may be grown on a growing substrate, and then the micro-LEDs are transferred from the growing substrate to a temporary substrate. Finally, the micro-LEDs are transferred from the temporary substrate to a display substrate (i.e., a target substrate), such that the miniature light-emitting diodes are arranged as an array on the display backplane to form a pixel array of the display.

Before transferring the microelectronic elements components from the temporary substrate to the target substrate, it is common to detect whether any of the microelectronic elements on the temporary substrate is damaged or defective, and remove the damaged or defective microelectronic components from temporary substrate. Conventionally, the apparatus for inspecting the temporary substrate and the apparatus for removing the microelectronic components are two different apparatuses, and thus it is required to move the temporary substrate to the detection apparatus for inspection after the microelectronic elements are removed. If the detection result is that the removal is unsuccessful, the temporary substrate needs to be moved to the removing apparatus again to remove the microelectronic components, and move the temporary substrate back to the detection apparatus, and so on until the detection apparatus confirms that microelectronic elements are successfully removed. However, the process of moving the temporary substrate between the apparatuses requires so many working hours, which is unfavorable to the mass production of electronic devices with microelectronic elements, such as micro-LED displays.

SUMMARY

The present application provides a defect detection and removal apparatus, which efficiently reduces working hours.

The present application provides a defect detection and removal method, which efficiently reduces working hours.

The present application provides a defect detection and removal apparatus including a removing unit, an image capturing unit, and a determining unit is provided. The removing unit is configured to remove at least one defective micro-element on a substrate. The image capturing unit is configured to capture a detection image of at least one defective micro-element correspondingly on the substrate. The determining unit is coupled to the image capturing unit and the removing unit. The image capturing unit executes capturing a first detection image before the removing unit executes removing a defective micro-element, and executes capturing a second detection image after the removing unit executes removing the defective micro-element. The determining unit confirms whether the defective micro-element has been removed according to the first and second detection image obtained from the image capturing unit.

The present application provides a defect detection and removal method, including: step 1: providing a substrate having at least one defective micro-element, and performing step 2 to step 5 at below according to a defective position of micro-element on the substrate stored in a defective database; step 2: using an image capturing unit to capture a first detection image before a defective micro-element is removed; step 3: using a removing unit to remove the defective micro-element according to the defective position of micro-element on the substrate stored in the defective database; step 4: using the image capturing unit to capture a second detection image after the defective micro-element is removed; and step 5: using a determining unit to compare the first detection image before the defective micro-element is removed with the second detection image after the defective micro-element is removed, and determining whether the defective micro-element is successfully removed according to a comparison result.

The defect detection and removal apparatus of embodiments of the present application, the removing unit and the image capturing unit are both included. Further, the determining unit confirms whether the defective micro-element is removed according to the first and second detection images obtained from the image capturing unit. Thus, after the defective micro-element is removed, the inspection of whether the defective micro-element is successfully removed can be performed by the same apparatus without moving the substrate to another apparatus for confirmation. Therefore, the defect detection and removal apparatus of embodiment of the present application can effectively reduce working hours. In the defect detection and removal method of the embodiment of the present application, functions of the removing unit and the image capturing unit are used together. The determining unit is used for comparing the first detection image before removing the defective micro-element and the second detection image after removing the defective micro-element, and determining whether the defective micro-element is successfully removed according to the comparison result. Therefore, the defect detection and removal method of the embodiment of the present application can effectively reduce working hours.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 is a flowchart of the defect detection and removal method according to an embodiment of the present application.

DESCRIPTION OF THE EMBODIMENTS

Figure 1:
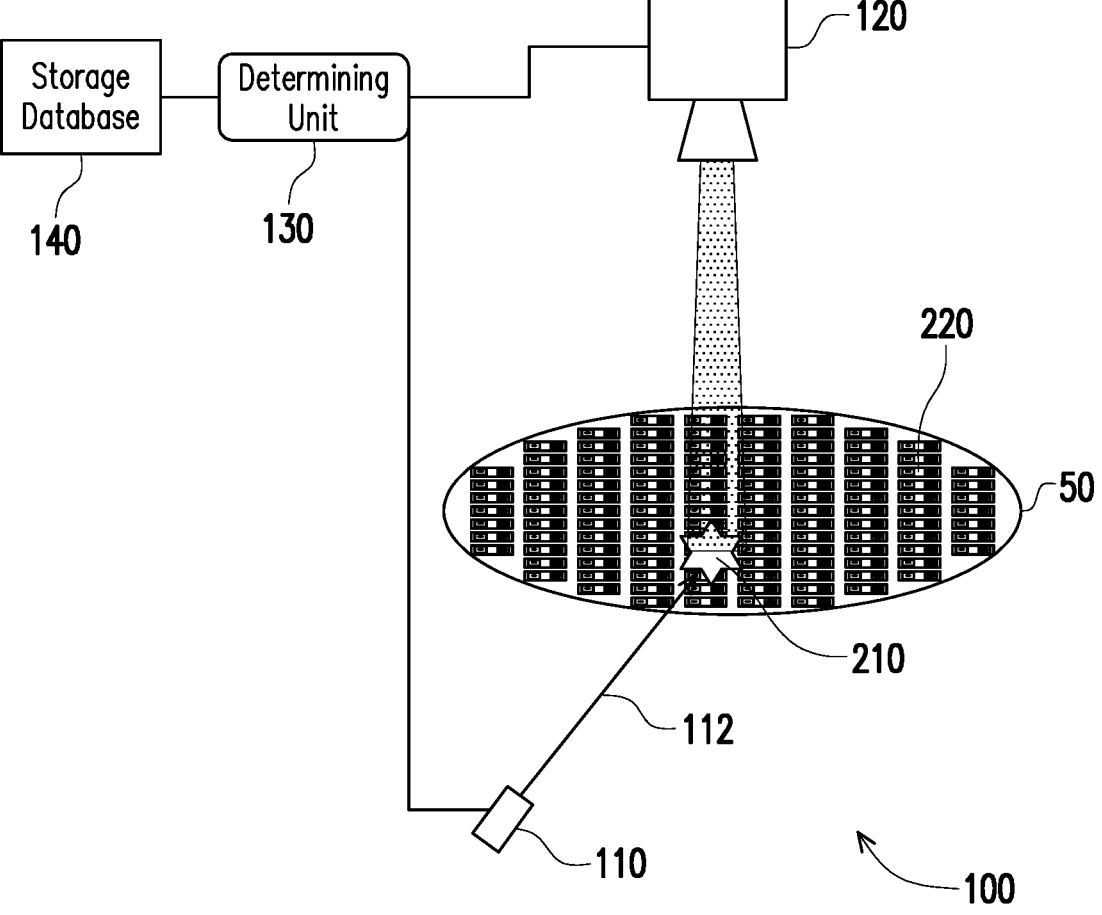
FIG. 1 is a structural diagram of a defect detection and removal apparatus according an embodiment of the present application.
Figure 2A:
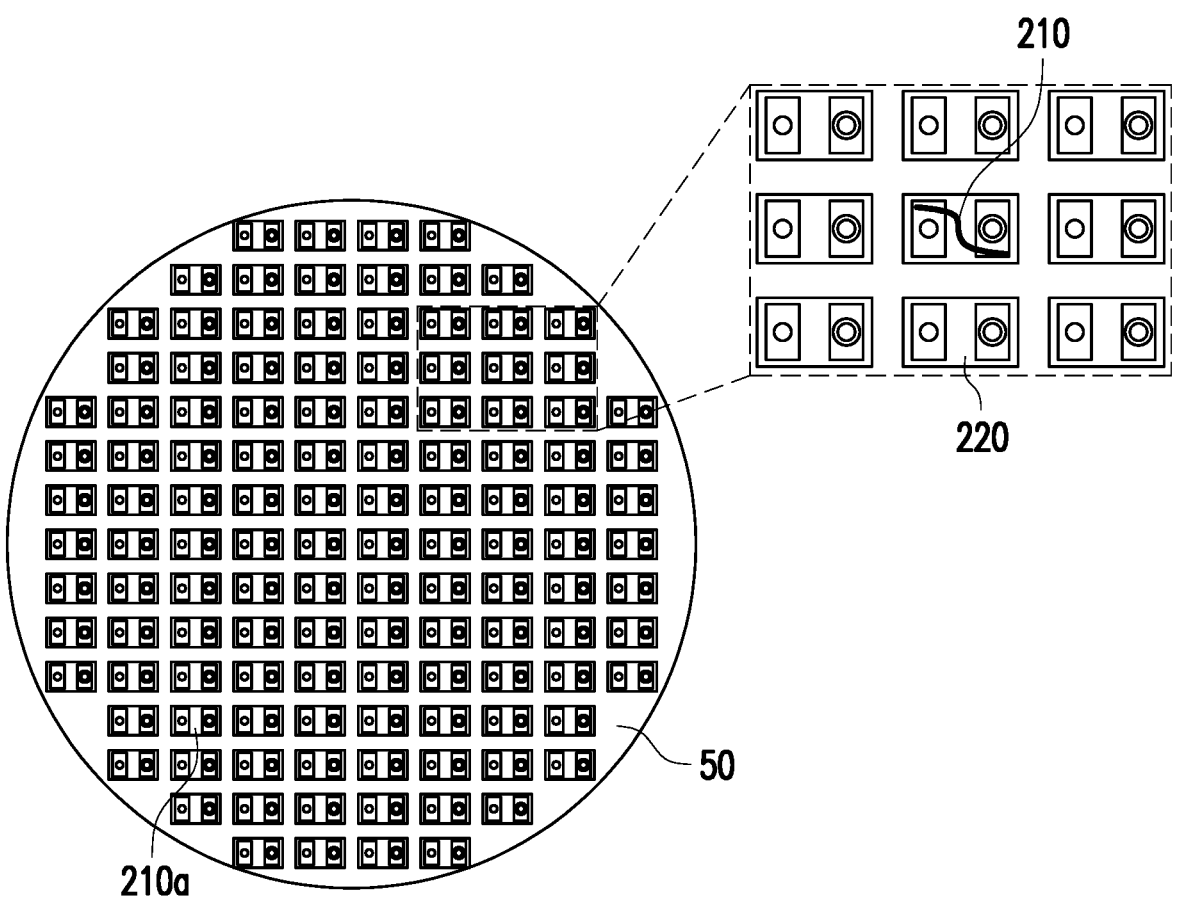
FIG. 2A is a schematic diagram of the first detection image captured by the image capturing unit depicted in FIG. 1 before the removing unit removes the defective micro-element.
Figure 2B:
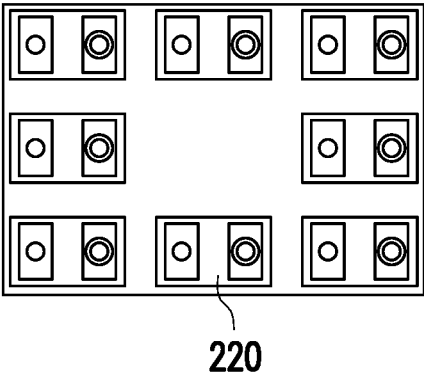
FIG. 2B is a schematic diagram of the second detection image captured by the image capturing unit in FIG. 1 after executing the removing unit to remove the defective micro-element.

FIG. 1 is a structural diagram of a defect detection and removal apparatus according an embodiment of the present application. FIG. 2A is a schematic diagram of a first detection image captured by the image capturing unit depicted in FIG. 1 before the removing unit removes the defective micro-element. FIG. 2B is a schematic diagram of a second detection image captured by the image capturing unit in FIG. 1 after executing the removing unit to remove the defective micro-element. Referring to FIGS. 1, 2A, and 2B, the defect detection and removal apparatus 100 of such embodiment includes a removing unit 110, an image capturing unit 120 and a determining unit 130. The removing unit 110 is configured to remove at least one defective micro-element 210 on a substrate 50. In such embodiment, in addition to the defective micro-element 210 is arranged on the substrate 50, a normal micro-element 220 (as shown in FIG. 2A) is also arranged. The defective micro-element 210 and the normal micro-element 220 include micro-electronic elements, conductive lines or combinations thereof, wherein the micro-electronic elements are, for example, micro-light emitting diodes or other micro-electronic elements. The removing unit 110 is, for example, a laser device, which can emit the laser beam 112 to the defective micro-element 210 so as to separate the defective micro-element 210 from the substrate 50. For example, the defective micro-element 210 and the normal micro-element 220 can be attached to the substrate 50 through an adhesive layer, and the laser beam 112 can be irradiated on the adhesive layer to debond the adhesive layer, thereby making the defective micro-element 210 to be separated from the substrate 50. Alternatively, the defective micro-element 210 and the normal micro-element 220 can be soldered on the substrate 50 by solder, and the laser beam 112 can be irradiated on the solder to melt the solder, thereby separating the defective micro-element 210 from the substrate 50. Alternatively, the defective micro-element 210 and the normal micro-element 220 may be fixed on the substrate 50 through various suitable methods, and the laser beam 112 can be irradiated on the interface between the defective micro-element 210 and the substrate 50, such that the defective micro-element 210 may be separated from the substrate 50.

The image capturing unit 120 is configured to capture the detection image corresponding to the at least one defective micro-element 210 on the substrate 50, such as the image of the enlarged view of FIG. 2A. The determining unit 130 is coupled to the image capturing unit 120 and the removing unit 110. The image capturing unit 120 captures a first detection image (as shown in the enlarged image of FIG. 2A) before the removing unit 110 removes a defective micro-element 210, and executes capturing a second detection image (as shown in FIG. 2B) after the removing unit 110 removes the defective micro-element 210. The determining unit 130 confirms whether the defective micro-element 210 is removed according to the first and second detection images obtained by the image capturing unit 120.

In such embodiment, the image capturing unit 120 is, for example, a camera. For example, the image capturing unit 120 may simultaneously include two image capturing sub-units, respectively are a line-scan camera and an area-scan camera (which may include, for example, charge-coupled devices or complementary). Of course, the image capturing sub-units may use merely the line scan camera or the area scan camera may be used in, or a combination any forms of cameras, or a combination of any of the above-mentioned cameras. Any functional module capable of obtaining images for further analysis can be applied to the image capturing unit.

In an embodiment, the determining unit 130 is, for example, a central processing unit (CPU), a graphics processing unit (GPU), a microprocessor, a digital signal processor (DSP), a programmable controller, a programmable logic device (PLD) or other similar devices or combinations of these devices, and is not limited in the present application. In addition, in an embodiment, each function performed by the determining unit 130 may be implemented as program codes. These codes are stored in a memory and executed by the determining unit 130. Alternatively, in an embodiment, the functions performed by the determining unit 130 may be implemented as one or more circuits. The present application does not limit whether each function performed by the determining unit 130 is implemented by software or hardware.

In such embodiment, the determining unit 130 is configured to, in response to determining a variation of comparing the first and second detection images exceeding a critical value, determine that the defective micro-element 210 is removed. For example, the image of the enlarged view in FIG. 2A is very different from the image in FIG. 2B in the middle area, which makes the variation exceeding the critical value, and thus the determining unit 130 may determine that the defective micro-element 210 has been removed. If the variation does not exceed the critical value, it means that the defective micro-element 210 is not successfully removed, and the determining unit 130 may accordingly determine that the defective micro-element 210 is not successfully removed.

In the defect detection and removal apparatus 100 of the present embodiment, the removing unit 110 and the image capturing unit 120 are both included. The determining unit 130 confirms whether the defective micro-element 210 is removed according to the first and second detection images obtained from the image capturing unit 120. Therefore, after the defective micro-element 210 is removed, the inspection of whether the defective micro-element 210 is successfully removed can be performed by the same apparatus without moving the substrate 50 to another apparatus for confirmation. Therefore, the defect detection and removal apparatus 100 can effectively reduce working hours.

Alternatively, in an embodiment, a detection image without the micro-element may be stored in a storage database 140, which is an image without micro-elements disposed on the substrate 50, such as the image in the central area of FIG. 2B. The determining unit 130 is configured to compare the second detection image with the detection image without the micro-element, and determine whether the defective micro-element 210 is removed. That is, when the second detection image is closer to or the same as the detection image without the micro-element, the determining unit 130 can determine that the defective micro-element 210 is successfully removed.

An amount of the defective micro-elements included in the substrate 50 is not limited to only one, which can be plural. FIG. 2A uses the defective micro-element 210 (also referred as a first defective micro-element) and the defective micro-element 210a (also referred as a second defective micro-element) as an example for description. In such embodiment, after the removing unit 110 removes the defective micro-element 210, the determining unit 130 is configured to confirm whether the defective micro-element 210 is removed. If the determining unit 130 determines that the defective micro-element 210 still exists, the determining unit 130, in response to the determination that the defective micro-element 210 still exists, instructs the removing unit 110 to remove of the defective micro-element 210 again. Alternatively, in another embodiment, the determining unit 130, in response to the determination that the defective micro-element 210 still exists, records the location of the defective micro-element 210 in the storage database 140, and instructs the removing unit 110 to remove the defective micro-element 210a (shown in FIG. 2B). That is, the positions of all the defective micro-elements on the substrate 50 can be detected by a preliminary automatic optical inspection (AOI) system before the defective micro-elements are removed, and stored in the storage database 140. Then, after the defective micro-element 210 is removed, if the determining unit 130 determines that there is still a defective micro-element 210, the determining unit 130 may note in the storage database 140 that the defective micro-element 210 at this location requires another removal, which may be performed after other defective micro-elements in the storage database 140 are removed.

Figure 3:
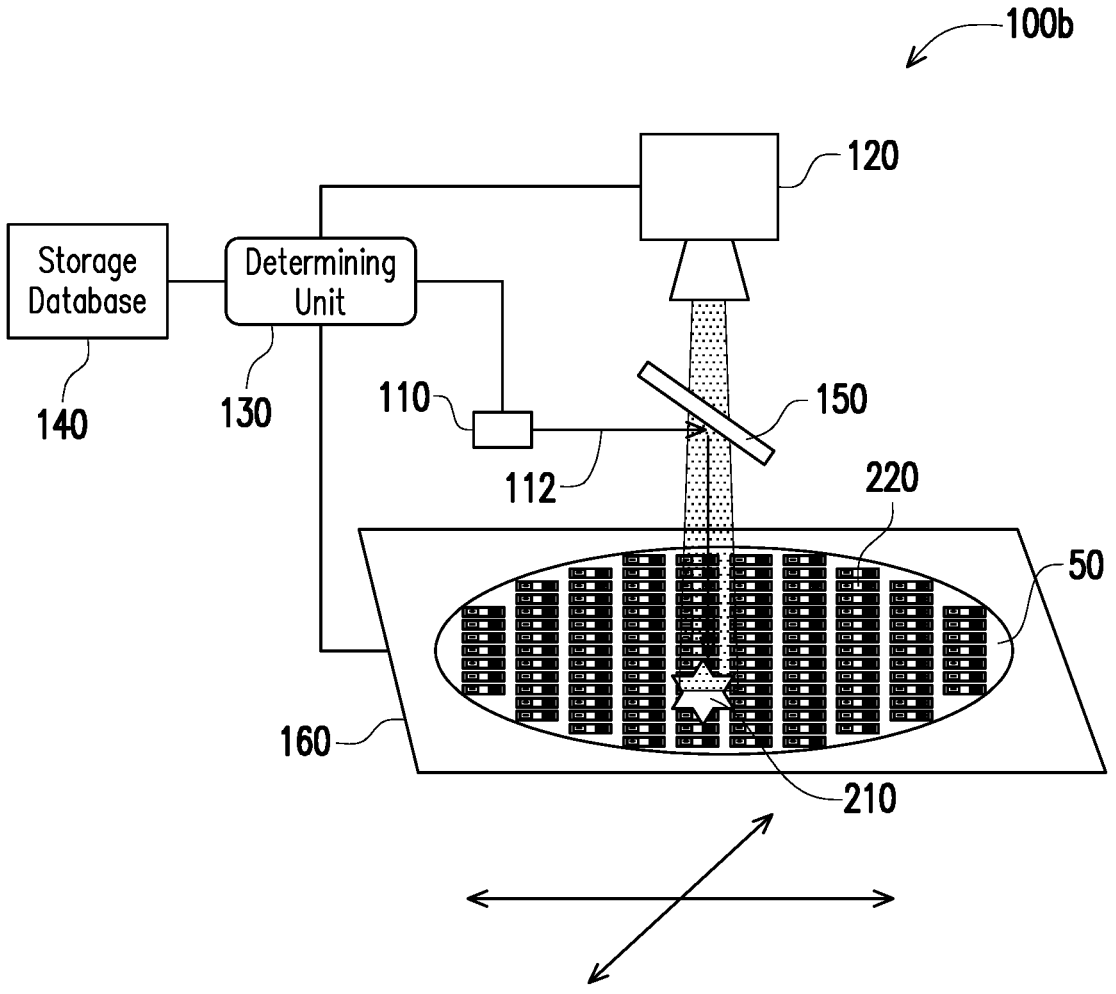
FIG. 3 is a structural diagram of the defect detection and removal apparatus according to another embodiment of the present application.

In such embodiment, the removing unit 110 and the image capturing unit 120 are respectively arranged on opposite sides of the substrate 50. However, in another embodiment as shown in FIG. 3, the removing unit 110 and the image capturing unit 120 are arranged on a same side of the substrate 50. Particularly, in the embodiment depicted in FIG. 3, the defect detection and removal apparatus 100b may further include a partially transmissive and partially reflective mirror 150 (e.g., a see-through mirror), which can reflect a part (e.g., half) of the laser beam 112 from the removing unit 110 to the defective micro-element 210, to remove the defective micro-element 210. In addition, the image capturing unit 120 can capture images before and after the defective micro-element 210 is removed through the partially transmissive and partially reflective mirror 150. Particularly, a part (e.g., half) of the light from the position before and after the defective micro-element 210 is removed will pass through the partially transmissive and partially reflective mirror 150 and transmitted to and sensed by the image capturing unit 120. In other embodiments, the positions of the removing unit 110 and the image capturing unit 120 can also be reversed, that is, the partially transmissive and partially reflective mirror 150 allows a part of the light to pass through and transmit to the defective micro-element 210. A part of the light comes from the position before and after the defective micro-element 210 is removed is reflected to the image capturing unit 120 by the partially transmissive and partially reflective mirror 150.

In the embodiment depicted in FIG. 1, the removing unit 110 may move relative to the substrate 50, so that the laser beam 112 is aligned with the position to be removed. Further, the image capturing unit 120 may be moved relative to the substrate 50 so that the image capturing unit 120 is aligned with the position to be shoot. In practice, the substrate 50 may be fixed, while the removing unit 110 and the image capturing unit 120 are movable. However, in another embodiment, the substrate 50 may also be moved by a carrier station, while the removing unit 110 and the image capturing unit 120 are fixed. In the embodiment of FIG. 3, the substrate 50 is arranged on the stage 160, and the stage 160 can move relative to the moving removing unit 110 and the image capturing unit 120, so that the laser beam 112 is aligned with the position to be removed and the capturing unit 120 is aligned to the position to be shoot.

FIG. 4 is a flowchart of the defect detection and removal method of an embodiment of the present application. Please refer to FIGS. 1, 2A, 2B, and 4, the defect detection and removal method of such embodiment can be carried out by using the defect detection and removal apparatus 100 or 100b of the above-mentioned embodiments. The defect detection and removal method depicted in FIG. 1 is used as an example for descriptions below. The defect detection and removal method of this embodiment includes step S110, step S120, step S130, step S140 and step S150. First, step S110 is executed, which is to provide the substrate 50 having at least one defective micro-element 210. Further, the following steps S120 to S150 are executed according to a defective position of the micro-element (which can be obtained through detecting the defective position of the entire substrate 50 by an automatic optical inspection system in advance) on the substrate 50 in a defective database (i.e., the storage database 140).

Next, step 120 is executed, which is to use the image capturing unit 120 to capture an image before the defective micro-element 210 is removed (i.e., the first detection image mentioned above). Then, step S130 is executed, which is to use the removing unit 110 to remove the defective micro-element 210 according to the defective position of the micro-element on the substrate 50 stored in the defective database (i.e., the storage database). Further, step S140 is executed, which is to use the image capturing unit 120 to capture the image after the defective micro-element 210 is removed. After that, step S150 is executed, which is to use the determining unit 130 to compare the image before the defective micro-element 210 is removed (i.e., the first detection image) and the image after the defective micro-element 210 is removed (i.e., the second detection image), and determine whether the defective micro-element 210 is successfully removed according to a comparison result. In such embodiment, the image before the defective micro-element 210 is removed (i.e., the first detection image) and the image after the defective micro-element 210 is removed (i.e., the second detection image) are captured by the same image capturing unit 120, which may capture comparison images more accurately.

Figure 5:
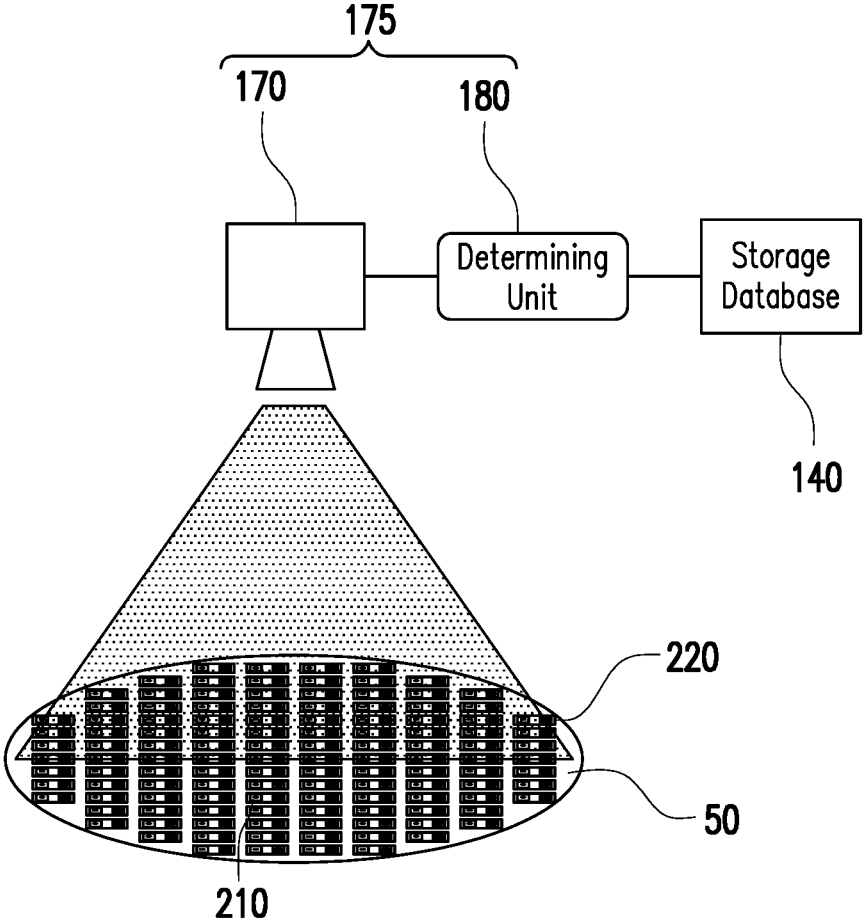
FIG. 5 is a schematic diagram of a detection unit adopted by the defect detection and removal method depicted in FIG. 4 executing an automatic optical inspection.

In such embodiment, the defect detection and removal method further includes, before step S110, using a detection unit 175 to perform an automatic optical inspection on the micro-element (including the normal micro-element 220 and the defective micro-element 210) arranged with the substrate 50 to obtain a position of the at least one defective micro-element 210 on the substrate 50 as shown in FIG. 5, and store the positions in the defective database (i.e., the storage database 140). The defective position in the defective database is determined based on the comparison result of images the automatic optical inspection performed. Specifically, the detection unit 175 may include an image capturing unit 170 and a determining unit 180. The image capturing unit 170 is, for example, a camera, which has a larger field of view relative to the image capturing unit 120, and capable of capturing a wider range on the substrate 50, for example, the entire substrate 50 at once, but the present application is not limited herein. Next, the image capturing unit 170 transmits the captured image to the determining unit 180, and the determining unit 180 can determine where the defective is located based on the image, and this defective database can be used in step S110 to step S150. In addition, the determining unit 180 may determine whether the micro-element detected by the image capturing unit 170 is a normal micro-element or a defective micro-element according to a golden sample stored in the storage database 140. The golden sample may include images of a normal micro-element, images of different defective micro-elements, images without micro-elements, or combinations thereof.

In an embodiment, the determining unit 180 is, for example, a central processing unit (CPU), a microprocessor, a digital signal processor (DSP), a programmable controller, a programmable logic device (PLD) or other devices alike or combinations thereof, which is not limited in the present application. In addition, in an embodiment, functions of determining unit 180 may be implemented as program codes. These program codes are stored in a memory, and are executed by the determining unit 180. Alternatively, in an embodiment, the functions of the determining unit 180 may be implemented on one or more circuits, and how the functions of the determining unit 180 is implemented through software or hardware is not limited in the present application.

In the defect detection and removal method of such embodiment, functions of both of the removing unit 110 and the image capturing unit 120 are utilized together. Further, the determining unit 130 is used to compare the image before the defective micro-element 210 is removed and the image after the defective micro-element 210 is removed, and to determine whether the defective micro-element 210 is successfully removed according to the comparison result. Therefore, the defective detection and removal method of such embodiment can effectively reduce working hours.

In such embodiment, step S150 includes performing an image processing and comparison to the image before the defective micro-element 210 is removed (i.e., the first detection image) with the image after the defective micro-element 210 is removed (i.e., the second detection image). If the variation of the comparison result exceeds the critical value, the determining unit 130 determines that the defective micro-element 210 is successfully excluded in response to the variation of the comparison result which exceeds the critical value. Otherwise, if the variation of the comparison result does not exceed the critical value, it is determined that the defective micro-element 210 is not successfully removed.

In another embodiment, the defect detection and removal method further includes, after step S150, comparing the image after the defective micro-element is removed (i.e., the second detection image) with an image without the micro-element (i.e., the detection image without the micro-element mentioned above), to determine whether the defective micro-element 210 is actually successfully removed. Regarding the comparison with the image without the micro-element, it is described in detail at paragraphs in relation to the detection image without the micro-element above, and will not be repeated herein. In an embodiment, the defect detection and removal method further includes: taking the image (i.e., the second detection image) which is captured after the defective micro-element 210 is removed in step S140 and is determined by the determining unit 130 that a position of the defective micro-element 210 is successfully removed as an image without the micro-element, and storing the image without the micro-element in a database of removed micro-element for subsequent use of reference in the micro-component transfer or patching. Wherein, the database of removed micro-element and the storage database 140 may be implemented by a memory, such as non-volatile memory, hard disk drive (HDD), solid state drive (SSD), optical storage, flash memory, random access memory, magnetic disks, optical discs and other devices having storage functions.

In such embodiment, the defect detection and removal method further includes, after step S150, in response to determining, by the determination unit 130, that the defective micro-element is successfully removed, moving the removing unit 110 to a position of a next defective micro-element (e.g., the defective micro-element 210a as shown in FIG. 2A), and performing step 120 to step 150. After performing the removal of the defective micro-element 210a, continue to move the removing unit 110 to a position of the next defective micro-element, and perform step S120 to step S150, and so on. Step S120 to step S150 for moving the removing unit 110 to the position of the next defective micro-element will be repeated until all defective micro-elements in the defective database are removed.

In such embodiment, the defect detection and removal method further includes: in response to determining, by the determining unit 130, that the defective micro-element is 210 is not successfully removed in step S150, storing the position of the defective micro-element 210 not being successfully removed in a storage database 140 for another removal afterwards.

In such an embodiment, the defect detection and removal method further includes: after the position of the defective micro-element 210 not being successfully removed is stored in the storage database, moving the removing unit 110 to the position of the next defective micro-element, and performing step S120 to step S150 until step S120 to step S150 are performed to each defective micro-element, and then performing step S120 to step S150 to the defective micro-element 210 not successfully removed according to the storage database 140.

In such an embodiment, the defect detection and removal method further includes: performing step 2 to step 5 repeatedly to the defective micro-element not being successfully removed according to the storage database until the determining unit 130 determines that the defective micro-element is successfully removed. However, when a repetition number of how many times step S120 to step S150 are performed is greater than a predetermined number, the repetition of step S120 to step S150 to the defective micro-element not being successfully removed will be stopped and the position of the defective micro-element not being successfully removed will be marked.

In the embodiments mentioned above, when the defective micro-element is removed for the first time without success, the operation jumps to the next defective micro-element and performs removal of the next defective micro-element. Further, after removal is performed to all the defective micro-elements, the operation will turn back to remove those defective micro-element not successfully removed. However, in another embodiment, another repetition of step S120 to step S150 may be immediately performed to the defective micro-element not being successfully removed according to the storage database for its removal after the determining unit 130 determines that the defective micro-element is not been successfully removed and the position of the defective micro-element not successfully removed is stored in the storage database 140. If the determining unit 130 determines that the removal is still unsuccessful, steps S120 to S150 are repeated to the defective micro-elements not successfully removed according to the storage database 140 until the determining unit 130 determines that the defective micro-element is successfully removed. However, if the repetition number of how many times step S120 to step S150 are performed is greater than a predetermined number, stop repeating step S120 to step S150 to the defective micro-elements not successfully removed, and mark the position of the defective micro-elements not successfully removed. Further, the removing unit 110 is moved to the position of the next defective micro-element for performing step S120 to step S150.

In summary, the defect detection and removal apparatus of embodiments of the present application, the removing unit and the image capturing unit are both included. Further, the determining unit confirms whether the defective micro-element is removed according to the first and second detection images obtained from the image capturing unit. Thus, after the defective micro-element is removed, the inspection of whether the defective micro-element is successfully removed can be performed by the same apparatus without moving the substrate to another apparatus for confirmation. Therefore, the defect detection and removal apparatus of embodiment of the present application can effectively reduce working hours. In the defect detection and removal method of the embodiment of the present application, functions of the removing unit and the image capturing unit are used together. The determining unit is used for comparing the first detection image before removing the defective micro-element and the second detection image after removing the defective micro-element, and determining whether the defective micro-element is successfully removed according to the comparison result. Therefore, the defect detection and removal method of the embodiment of the present application can effectively reduce working hours.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A defect detection and removal method, comprising:
step 1: providing a substrate having a plurality of defective micro-elements, and sequentially performing step 2 to step 8 at below according to a plurality of defective positions of the defective micro-elements on the substrate stored in a defective micro-element database;
step 2: using an image capturing unit to capture a first detection image before each of the defective micro-elements is removed;
step 3: using a removing unit to remove each of the defective micro-elements according to the defective position of each of the defective micro-elements on the substrate stored in the defective database;
step 4: using the image capturing unit to capture a second detection image after each of the defective micro-elements is removed; and step 5: using a determining unit to compare the first detection image before each of the defective micro-elements is removed with the second detection image after each of the defective micro-elements is removed to determine whether each of the defective micro-elements is successfully removed, thereby generating a comparison result;
step 6: storing a position of the defective micro-element not being successfully removed in step 5 in a storage database in response to the comparison result compared by the determining unit;
step 7: moving the removing unit to the position of the next defective micro-element, and performing step 2 to step 6 until step 2 to step 6 are performed to all of the defective micro-elements; and
step 8: repeatedly performing step 2 to step 5 to each of the defective micro-elements not being removed according to the storage database until the defective micro-element is successfully removed or a repetition number is reached.

2. The defect detection and removal method of claim 1, further comprising:
before step 2, using a detection unit to perform an automatic optical inspection on the micro-element arranged with the substrate, to obtain a position of the at least one defective micro-element on the substrate, and storing the position in the defective database.

3. The defect detection and removal method of claim 1, wherein the first detection image before the defective micro-element is removed and the second detection image after the defective micro-element is removed are captured by the same image capturing unit.

4. The defect detection and removal method of claim 1, wherein step 5 comprising:
performing an image processing and comparison to the first detection image before the defective micro-element is removed with the second detection image after the defective micro-element is removed, and the determining unit, in response to a variation of the comparison result exceeding a critical value, determining that the defective micro-element is successfully removed.

5. The defect detection and removal method of claim 1, further comprising: comparing the second detection image after the defective micro-element is removed with an image without the micro-element after step 5, to determine whether the defective micro-element is actually successfully removed.

6. The defect detection and removal method of claim 1, further comprising:
after step 5, in response to determining, by the determination unit, that the defective micro-element is successfully removed, moving the removing unit to a position of a next defective micro-element, and performing step 2 to step 5.

7. The defect detection and removal method of claim 1, further comprising:
taking the second detection image which is captured after the defective micro-element is removed in step 4 and is determined by the determining unit that a position of the defective micro-element is successfully removed as an image without the micro-element, and storing the image without the micro-element in a database of removed micro-element for subsequent use of reference in the micro-component transfer or patching.

8. The defect detection and removal method of claim 1, further comprising:

in response to the repetition number is reached, marking the position of the defective micro-element not being successfully removed in the storage database.

9. A defect detection and removal method, comprising:

step 1: providing a substrate having a plurality of defective micro-elements, and sequentially performing step 2 to step 7 at below according to a plurality of defective positions of the defective micro-elements on the substrate stored in a defective micro-element database;

step 2: using an image capturing unit to capture a first detection image before each of the defective micro-elements is removed;

step 3: using a removing unit to remove each of the defective micro-elements according to the defective position of each of the defective micro-elements on the substrate stored in the defective database;

step 4: using the image capturing unit to capture a second detection image after each of the defective micro-elements is removed; and step 5: using a determining unit to compare the first detection image before each of the defective micro-elements is removed with the second detection image after each of the defective micro-elements is removed to determine whether each of the defective micro-elements is successfully removed, thereby generating a comparison result;

step 6: storing a position of the defective micro-element not being successfully removed in step 5 in a storage database in response to the comparison result compared by the determining unit; and step 7: after the position of the defective micro-element not being successfully removed is stored in the storage database, immediately performing step 2 to step 5 again to the defective micro-element not being successfully removed according to the storage database.

10. The defect detection and removal method of claim 9, step 7 further comprising:

repeating step 2 to step 5 to the defective micro-element not being successfully removed according to the storage database until the determining unit determines that the defective micro-element is successfully removed, but stopping repetitions of performing step 2 to step 5 to the defective micro-element not being successfully removed when a repetition number of how many times step 2 to step 5 are performed is greater than a predetermined number, and marking the position of the defective micro-element not being successfully removed, and moving the removing unit to the position of the next defective micro-element for performing step 2 to step 5.

* * * * *